United States Patent
Kostyk et al.

(10) Patent No.: US 8,126,581 B2
(45) Date of Patent: *Feb. 28, 2012

(54) IMPROVING DESIGN MANUFACTURING, AND TRANSPORTATION IN MASS MANUFACTURING THROUGH ANALYSIS OF DEFECT DATA

(75) Inventors: Timothy J. Kostyk, Louisville, KY (US); Theresa C. Kratschmer, Yorktown Heights, NY (US); Jeff R. Layton, New York, NY (US); Peter Kenneth Malkin, Ardsley, NY (US); Stephen G. Perun, Evans, GA (US); Kenneth L. Pyra, Cave Creek, AZ (US); Padmanabhan Santhanam, Yorktown Heights, NY (US); John C. Thomas, Yorktown Heights, NY (US); Scott W. Weller, Penfield, NY (US)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/876,035

(22) Filed: Oct. 22, 2007

(65) Prior Publication Data
US 2008/0051924 A1 Feb. 28, 2008

Related U.S. Application Data

(62) Division of application No. 11/330,823, filed on Jan. 12, 2006, now Pat. No. 7,305,325.

(51) Int. Cl.
G06F 17/00 (2006.01)
G06F 7/00 (2006.01)

(52) U.S. Cl. .......... 700/110; 700/105; 700/97; 700/108; 700/115; 702/183; 702/185; 702/81; 705/7; 705/9; 235/375

(58) Field of Classification Search .................. 700/110, 700/90–100; 702/183
See application file for complete search history.

(56) References Cited

U.S. PATENT DOCUMENTS

| 6,408,219 | B2 * | 6/2002 | Lamey et al. ................. 700/110 |
| 6,895,387 | B1 * | 5/2005 | Roberts et al. ............. 705/14.47 |
| 6,944,855 | B2 * | 9/2005 | Konas ........................... 717/168 |
| 6,959,268 | B1 * | 10/2005 | Myers, Jr. et al. ................ 703/6 |
| 7,272,475 | B2 * | 9/2007 | Gawlik et al. .................. 701/29 |
| 7,337,124 | B2 * | 2/2008 | Corral .............................. 705/9 |

(Continued)

OTHER PUBLICATIONS

Karam et al,"DuoTarcker: Tool Support for Software Defect Data Cpllection and Analysis", Oct. 2006,IEEE, pp. 1-5.*

(Continued)

Primary Examiner — Albert DeCady
Assistant Examiner — Olvin Lopez Alvarez
(74) Attorney, Agent, or Firm — Michael J. Buchenhorner; Vazken Alexanian

(57) ABSTRACT

A system for optimizing at least one of a design, production, or testing process of a product in a mass manufacturing process includes: a central processing unit; a network interface operatively connected to the central processing unit; a storage device; a memory including logic for execution by the central processing unit, wherein the logic includes: a server handler made up of a client applet and a client interface servlet which are configured for enabling authorized end-user communication; an error data collection handler configured for gathering error data; an error data classification handler; an analysis handler; a suggested actions report handler; and the system further includes a server database configured for storing, modifying, and deleting data.

5 Claims, 6 Drawing Sheets

U.S. PATENT DOCUMENTS

| | | | |
|---|---|---|---|
| 7,428,546 B2* | 9/2008 | Nori et al. | 707/101 |
| 7,478,000 B2* | 1/2009 | Kratschmer et al. | 702/83 |
| 7,478,092 B2* | 1/2009 | Warburton et al. | 1/1 |
| 7,516,450 B2* | 4/2009 | Ogura | 717/168 |
| 7,729,883 B2* | 6/2010 | Kostyk et al. | 702/183 |
| 7,945,426 B2* | 5/2011 | Kostyk et al. | 702/183 |
| 2002/0161700 A1* | 10/2002 | Ernst et al. | 705/38 |
| 2003/0182167 A1* | 9/2003 | Kalthoff et al. | 705/7 |
| 2004/0059636 A1* | 3/2004 | McClung et al. | 705/26 |
| 2005/0132348 A1* | 6/2005 | Meulemans et al. | 717/168 |
| 2005/0222817 A1* | 10/2005 | Achacoso et al. | 702/185 |
| 2005/0278597 A1* | 12/2005 | Miguelanez et al. | 714/738 |
| 2006/0066338 A1* | 3/2006 | Rajski et al. | 324/765 |
| 2006/0161391 A1* | 7/2006 | Inaba et al. | 702/183 |
| 2007/0066338 A1* | 3/2007 | Lee et al. | 455/522 |
| 2007/0118531 A1* | 5/2007 | Gatton et al. | 707/10 |
| 2007/0150084 A1* | 6/2007 | Grubb et al. | 700/110 |
| 2008/0162304 A1* | 7/2008 | Ourega | 705/27 |

OTHER PUBLICATIONS

Rhee, Seung Joon. "Lifecycle Cost Based Failure Modes and Effects Analysis." ProQuest Information and Learning Company, 2005. pp. 1-9, 19, 24, 28-33, 42, 120-135.*

Chillarege, Ram, et al. "Orthogonal Defect Classification: A Concept for In-Process Measurements." IEEE Transactions on Software Engineering. vol. 18, No. 11 (Nov. 1992). pp. 943-956.*

Liu, Wei, and S. Hossein Cheraghi. "Intelligent Orthogonal Defect Classification (ODC) towards Manufacturing Nonconformance Tracking and Diagnostic Recovery." Proceedings of IERC Conference (2002)., pp. 1-6.* http://www.aldservice.com/en/reliability-services/failure-data-collection-fracas.html, ALD Ltd, pp. 1-4, 2009.* http://www.aldservice.com/en/reliability-products/fracas.html, Fracas, pp. 1-6, 2005.* http://www.favoweb.com/technology.html, Favoweb, 2005, pp. 1-4.*

Jalote, Pankaj, and Naresh Agrawal. "Using Defect Analysis Feedback for Improving Quality and Productivity in Iterative Software Development." Information and Communications Techology, 2005: Enabling Technologies for the New Knowledge Society: ITI 3rd International Conference on Information and Communications Technology. Dec. 5-6, 2005. pp. 703-713.*

Butcher, M., et al. "Improving software testing via ODC: Three case studies." IBM Systems Journal. vol. 41, No. 1 (2002). pp. 31-44.* http://web.archive.org/web/20051202010839/kmbs.konicaminolta.us, 2005, pp. 3.* http://www.answers.com/topic/product, 2010, pp. 1-3.*

Product Lifecycle Management, 2005, Springer Berling, pp. 1-22.*

Komminos, "Product Life Cycle Management", 2002, pp. 1-26.*

Jack Silberman, "Robot Orthogonal Defect Classification Towards an in-Process Measurement System for Mobile Robot Development," Jan. 1998.

* cited by examiner

IMPROVING DESIGN MANUFACTURING, AND TRANSPORTATION IN MASS MANUFACTURING THROUGH ANALYSIS OF DEFECT DATA

CROSS-REFERENCE TO RELATED APPLICATIONS

This application is a division of commonly-owned, U.S. application Ser. No. 11/330,823 filed Jan. 12, 2006, now U.S. Pat. No. 7,305,325, which is incorporated by reference herein. Commonly-owned and co-pending U.S. application Ser. No. 11/926,556, filed on Oct. 29, 2007 is also a division of U.S. Pat. No. 7,305,325.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention relates generally to the use of information technology in industrial processes and more specifically to mass manufacturing processes.

BACKGROUND OF THE INVENTION

Minimizing costs and improving product quality is a goal of any product development company. To the manufacturer one of the most costly aspects in a product's life cycle is servicing product defects after the product has left manufacturing. Present methods use quality control tests on a manufactured item that are done by a single department such as a quality control department. Such tests are expensive to perform and it is also expensive and difficult to use the results. One present technology is Orthogonal Defect Classification (ODC) which addresses software defects found during development and by customers, but only software, not hardware and only defects found during development. Another known method is Orthogonal Problem Classification (OPC), which addresses software problems reported by customers, but does not address mass manufacturing industry, it only addresses software.

Another technology, Warranty Management Solutions (WMS) facilitates handling by management of warranty related data but provides no feedback to modify production. Quality Control testing products before product release provide no feedback mechanism back to production and design facilities.

Therefore, there is a need for a solution that overcomes the deficiencies of the prior art.

SUMMARY OF THE INVENTION

Briefly, according to an embodiment of the invention a system for optimizing at least one of a design, production, or testing process of a product in a mass manufacturing process includes: a central processing unit; a network interface operatively connected to the central processing unit; a storage device; a memory including logic for execution by the central processing unit, wherein the logic includes: a server handler made up of a client applet and a client interface servlet which are configured for enabling authorized end-user communication; an error data collection handler configured for gathering error data; an error data classification handler; an analysis handler; a suggested actions report handler; and the system further includes a server database configured for storing, modifying, and deleting data.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
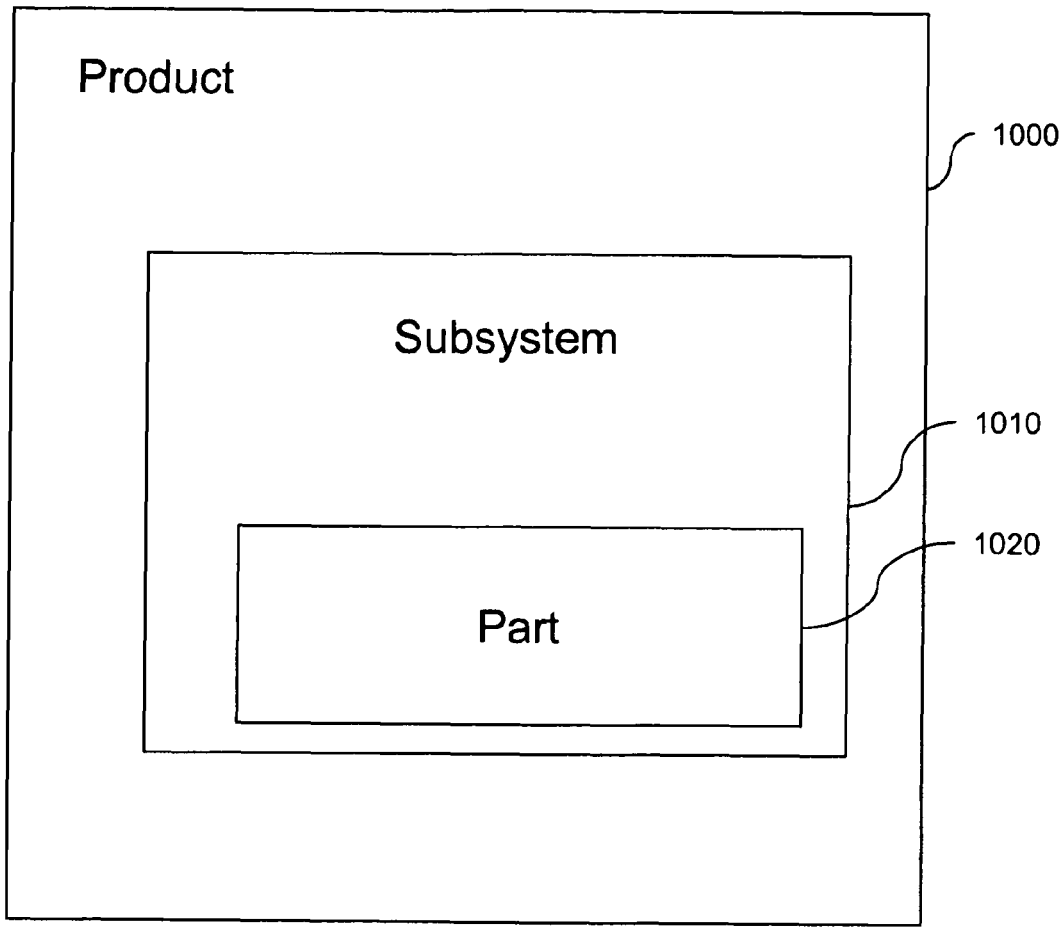
FIG. 1 is a simplified illustrative block diagram of a mass-manufactured product handled by a method according to one embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a server for optimizing the production and testing of products produced by a mass manufacturer, i.e. where many (virtually) identical copies of a given product are produced in exactly the same way. This is in contrast to cases where heroic, unique methods are used each time. The preferred embodiment will describe how the current invention is used to optimize the production and testing processes of a mass manufacturing plant 3010, whose products 1000 are sold by a product dealer 3020 and repaired by a product service provider 3030 (as will be described in detail with references to FIGS. 1-5).

FIG. 1 is a component block diagram of an example of the product 1000 produced, sold and serviced in the preferred embodiment. As shown, the product 1000 includes a subsystem 1010, which includes a part 1020. Although only a single subsystem 1010 and a single part 1020 are shown, the current invention is also applicable to products 1000 that include two or more subsystems 1010 and subsystems 1010 that include two or more parts 1020. An example of such a product is a personal computer (product), a communication subsystem (the subsystem), and a chipset (port) according to a protocol such as the Ethernet.

Figure 2:
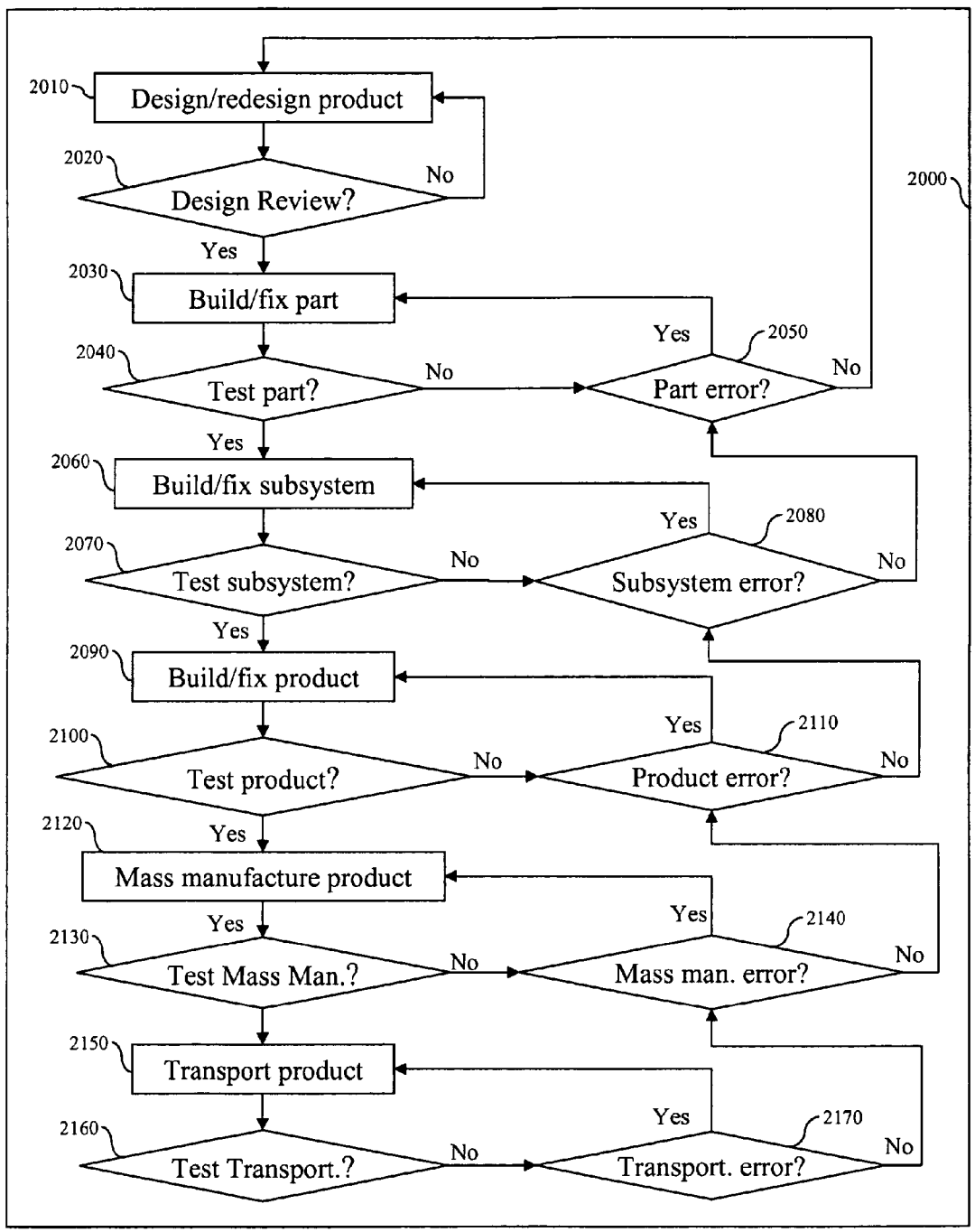
FIG. 2 is an illustrative flow diagram of the mass manufacturing industry's production, testing, and delivery processes according to one embodiment of the invention.

FIG. 2 is an illustrative flow diagram of the mass manufacturing industry's production, testing, and delivery processes 2000 according to an embodiment of the invention. As shown, the overall process 2000 begins at step 2010 where the design of the product 1000 is created. Next, in step 2020, the design is reviewed, and, if any errors (defects) are identified, control continues at step 2010, where the identified design error is corrected. Otherwise, in step 2030, an instance of the part 1020 is built, followed by step 2040 where the instance of the part 1020 is tested. If an error is identified, then step 2050 checks whether it is a part error. If so, control continues at step 2030 where the error is corrected. If the error is not a part error, then it must be design error and so control continues at step 2010 where the design is corrected to overcome the error. If no part error is found in step 2040, then control continues at step 2060 where an instance of the subsystem 1010 is built. Next, the instance of the subsystem 1010 is tested in step 2070. If an error is detected, then in step 2080 the error is checked to determine if it one with the subsystem. If so, control continues at step 2060 where the subsystem error is corrected. If the detected error is not one with the subsystem, then control continues at step 2050, which determines how the detected error, either a part or design error, is handled, as described above.

If step 2070 does not detect any errors, then step 2090 is executed, where an instance of the product 1000 is built, following which the product 1000 instance is tested in step 2100. If an error is detected, then in step 2110 the error is checked to determine if it one with the product. If so, control continues at step 2090 where the product error is corrected. If the detected error is not one with the product, then control continues at step 2080, which determines how the detected error, either a subsystem, part or design error, is handled, as described above.

If step 2100 does not detect any errors, then step 2120 is executed, where an instance of the mass manufactured product 1000 is created using the mass manufacturing process (e.g., including but not limited to an assembly line, and robotics), following which the mass manufactured product 1000 instance is tested in step 2130. If an error is detected, then in step 2140 the error is checked to determine if it one with the mass manufacturing process (e.g., the bolts that hold the wheels on are not being sufficiently tightened). If so, control continues at step 2120 where the mass manufacturing process error is corrected (e.g., wheel bolts are screwed on more tightly). If the detected error is not one with the mass manufacturing process, then control continues at step 2110, which determines how the detected error, either a product, subsystem, part or design error, is handled, as described above.

If step 2130 does not detect any errors, then step 2120 is executed, where the instance of the mass manufactured product 1000 is transported to the Product Dealer 3020 (described in detail with reference to FIG. 3). Once delivered, mass manufactured product 1000 instance is tested in step 2160. If an error is detected, then in step 2170 the error is checked to determine if it one with the transportation process (e.g., the product's paint scratched by the vehicles that carry the product to the Product Dealer 3020). If the error is one with the transportation process, control continues at step 2150 where the transportation process error is corrected (e.g., the products are covered with a protective wrap before being shipped). If the detected error is not one with the transportation process, then control continues at step 2140, which determines how the detected error, either a mass manufacturing process, product, subsystem, part or design error is handled, as described above.

Skilled artisans will appreciate that any of test processes other than Design Review 2020 (i.e., Part Test 2040, Subsystem Test 2070, Product Test 2100, Mass Manufacturing Test 2130 and Transportation Test 2160) could include stress testing (i.e., operating a given component [i.e., part, subsystem or product] up to or beyond one or more of its specified maximum limits) and environmental testing (i.e., testing a given component in one or more of is specified maximally adverse conditions). So, for example, the Part Test 2040 for tires could include running the inflated tires repeatedly of a series of bumps (for stress testing). Similarly for environmental testing, the Manufacturing Test 2130 could include driving each car (cars being the product) through 110 degree (Fahrenheit) heat.

Figure 3:
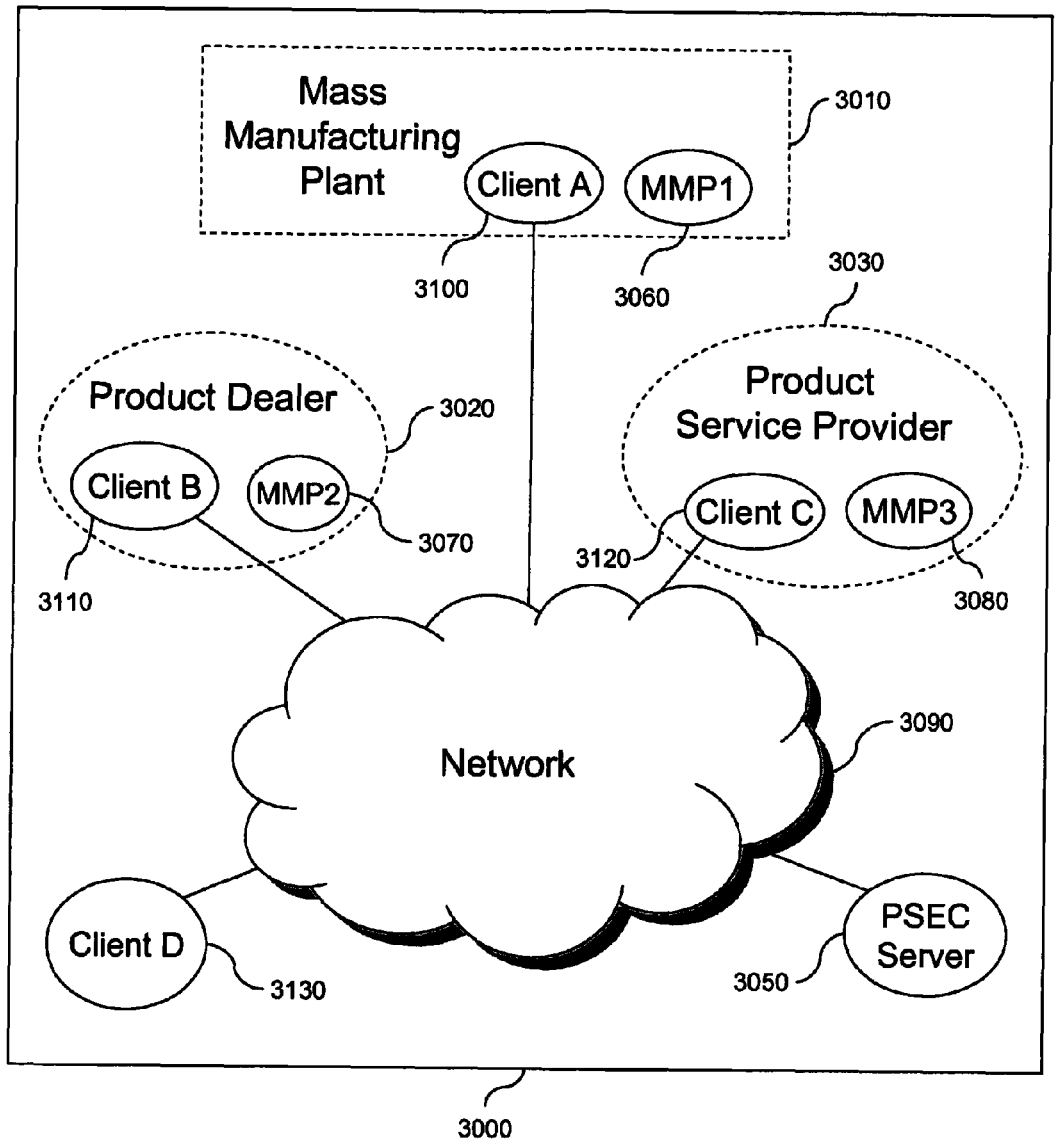
FIG. 3 is an illustrative schematic diagram of a network architecture for one embodiment of the invention.

FIG. 3 depicts a network topology 3000 providing an execution environment implementing the functionality of a system for the current embodiment. The network topology 3000 includes: a Mass Manufacturing Plant 3010; a Product Dealer 3020; a Product Service Provider 3080; a Client D 3130, and a PSEC Server 3050. The Mass Manufacturing Plant 3010 comprises a location, including, but not limited to a building, or set of buildings, co-located or geographically distributed, wherein a Client A 3100 and an instance of mass manufactured product 1000 (MMP1 3060) is located. This location 3010 is where instances of the mass manufactured product 1000 are created.

The Product Dealer 3020 comprises a location, including, but not limited to a building, or set of buildings, co-located or geographically distributed, wherein a Client B 3110 and an instance of mass manufactured product 1000 (MMP2 3070) is located. This location 3020 is where instances of the mass manufactured product 1000 are sold.

The Product Service Provider 3030 depicts a location, including, but not limited to a building, or set of buildings, co-located or geographically distributed, wherein a Client C 3120 and an instance of mass manufactured product 1000, MMP3 3080 are located. This location 3030 is where instances of the mass manufactured product 1000 are repaired or serviced.

Each of Clients A-D 3100-3130 and the PSEC Server 3050 are able to communicate with each other via a network 3090. The network 3090 comprises: the Internet, an internal intranet, or a public or private wireless or wired telecommunication network.

Skilled artisans will appreciate that although only one each of the Mass Manufacturing Plant 3010, the Product Dealer 3020 and the Product Service Provider 3030 are depicted in FIG. 2, other embodiments are also applicable to cases where there are a greater number of one or more of these entities 3010-1030. Skilled artisans will also appreciate that other embodiments are also applicable to cases where the three entities 3010-3030 are co-located.

Each of Clients A-D 3100-3130 enable an authorized user to interact with the PSEC Server 3050 (as will be discussed in further detail below) with reference to FIGS. 3-5. An example of a platform that supports the Clients A-D 3100-3130 includes any computing node that can act as web client (i.e., runs a web browser application and can communicate with the PSEC Server 3050 via the network 3090). Such software comprises Microsoft's Internet Explorer®. Still another example of a platform that supports the Clients A-D 3100-3130 includes, but is not limited to: an IBM ThinkPad running on a Windows based operating system such as Windows XP, or like operating system. Other contemplated operating systems include Linux, UNIX, and the like.

Clients A-D 3100-3130 may also include network-connectable mobile (i.e., portable) devices such as some cellular telephones (i.e., devices which function as a cellular telephone and execute network applications, like web browsers).

Although only four Clients A-D 3100-3130 are shown in FIG. 1, the current invention is also applicable to any number of client nodes greater than or equal to 1.

Further, while the preferred embodiment includes a Web-based (i.e., HTTP) client 3100-3130, other forms of network communication are also applicable, such as a sockets-based client/server architecture, e.g., implementing secure sockets layer (SSL) or like network communications protocols.

Skilled artisans will appreciate that the current invention is also applicable to cases where there is only a single client node, which resides on the same machine as the PSEC Server 3050, thereby eliminating the need for any network communication at all.

Figure 4:
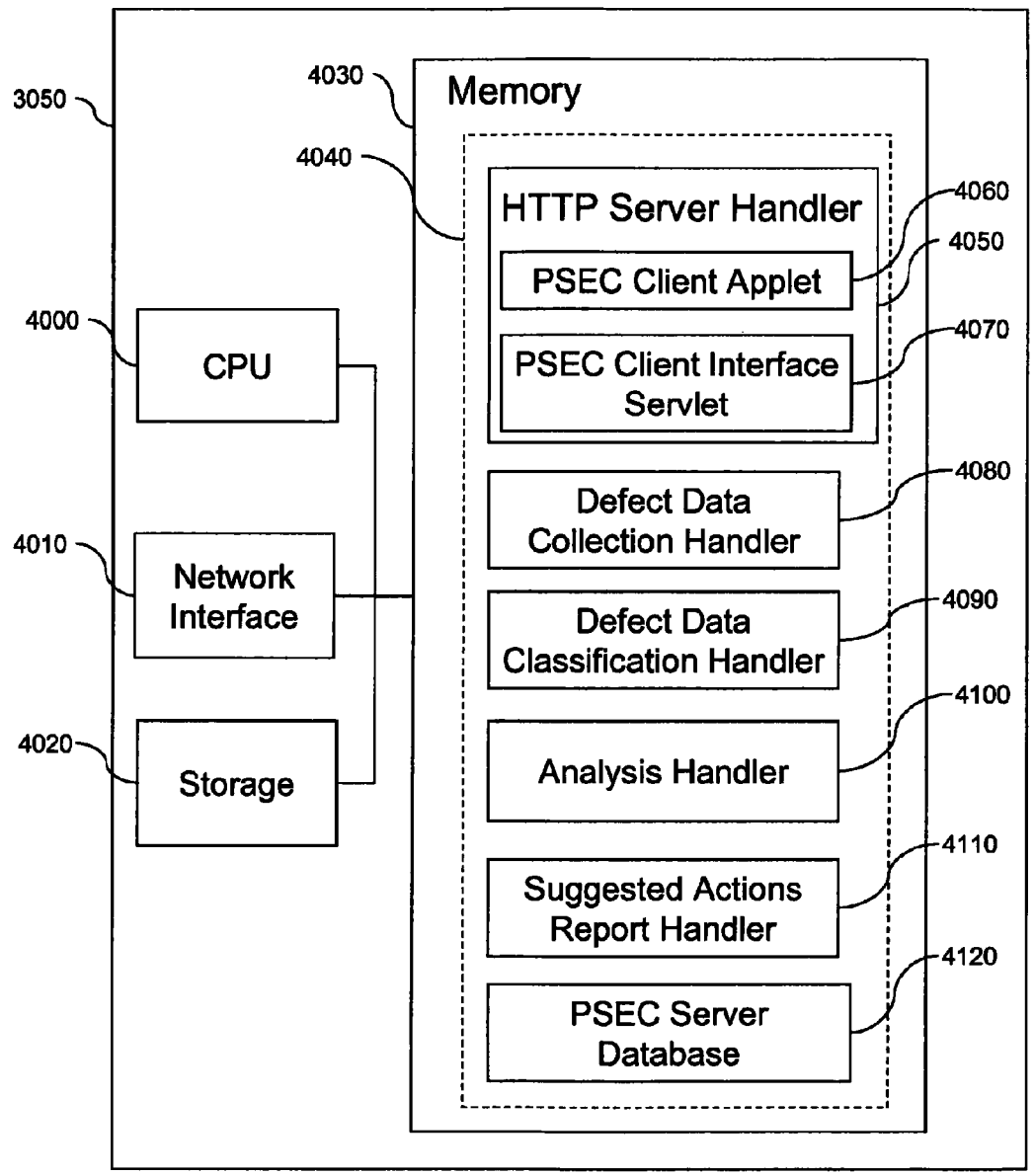
FIG. 4 is an illustrative block diagram of a PSEC Server (a computing node acting as an HTTP server) according to one embodiment of the invention.

FIG. 4 is a block diagram of the PSEC Server 3050. The PSEC Server 3050 is a computing node that acts as an HTTP server. The PSEC Server 3050 includes a CPU 4000, a network interface 4010, and a storage device 4020 such as a disk or data access storage device (DASD), and memory 4030, such as RAM. The network interface 4010 allows the PSEC Server 4050 to communicate with other network connected nodes via the network 3090. Such interfaces include, but are not limited to: Ethernet, and wireless IP (Internet Protocol, e.g., LEAP, CDMA or WAP).

In the present embodiment, the PSEC Server 3050 also includes PSEC Server logic 4040, which is embodied as computer executable code that is loaded into memory 4030 (for execution by CPU 4000) from a remote source (e.g., over the network 3090 via the network interface 4010), local permanent optical (CD-ROM), or from the storage device 4020 (e.g. disk or DASD).

The PSEC Server logic 4040 stored in the memory 4030 includes an HTTP Server Handler 4050, which includes a PSEC Client Applet 4060 and a PSEC Client Interface Servlet 4070. The PSEC Server logic 4040 further includes a Defect Data Collection Handler 4080, a Defect Data Classification Handler 4090, an Analysis Handler 4100, a Suggested Actions Report Handler 4110, and a PSEC Server Database 3120.

The HTTP Server Handler 4050 is an application that can respond to HTTP communications, comprising: the WebSphere™ product sold by IBM.

The PSEC Client Applet 4060 and PSEC Client Interface Servlet 4070 together enable an authorized end-user to communicate with the Defect Data Collection Handler 4080, Defect Data Classification Handler 4090, Analysis Handler 4100, and Suggested Actions Report Handler 4110. When the end-user wants to interact with the PSEC Server 4050, the end-user first downloads the PSEC Client Applet 4060 to a web browser running on their client, Clients A-D 4100-4130. To download the PSEC Client Applet 4060, the end-user must provide sufficient credentials (e.g., user ID and password).

After the PSEC Client Applet 4060 has been downloaded and enabled, the PSEC Client Applet 4060 communicates directly with the PSEC Client Interface Servlet 4070, which is executing in the HTTP Server Handler 4050. The HTTP Server Handler 4050, in turn, communicates locally with the other handlers 4090-4110 executing on the server 4050. Skilled artisans will recognize that this applet/servlet paring is well known in the art (e.g., see Jason Hunter with William Crawford, Java Servlet Programming (Sebastopol, Calif.: O'Reilly & Associates, Inc., 1988), pp. 277-337). Skilled artisans will also appreciate that the communication between the Clients A-D 4100-4130 and the handlers 4090-4110, in other embodiments can be implemented using other socket-based applications.

The PSEC Server Database 4120 allows the PSEC Server 4050 to store, modify, and delete data related to misinformation, usage patterns, users, and online community servers. A detailed description of the information maintained by the PSEC Server Database 4120 is given below. The PSEC Server Database 4120 can be implemented using database tools such as the DB/2 product sold by IBM, and like database platforms. One with skill in the art will appreciate that in other embodiments, the PSEC Server Database 4120 can be a service that runs on another server and is accessed by the PSEC Server 4050 via the network 4090.

The Defect Data Collection Handler 4080 enables the current invention to gather a set of defect data regarding the mass manufactured product 1000 and the processes of its production, testing and delivery 2000. This data includes but is not limited to: Defects founds during product 1000 development, such as design defects discovered during the design review 2020, Defects found in instances of the product 1000 after manufacturing 2110, but before delivery, such as cases where the mass manufacturing process 2120 has failed to tighten the bolts that hold the wheels on. Defects that occur as a result of the transportation process 2150, such as paint being chipped during shipping due insufficient secure restraints in the delivery vehicle, and Defects found at the Product Service Provider 3030, such as a case where an unreliable tire is identified by the fact that many instances of the product 1000 are brought in where one or more of the tires has burst during operation. Note that this data comes from in-process and post delivery. All such data is stored in the PSEC Server Database 4120.

The Defect Data Classification Handler 4090 takes all of the stored defects and either types or adds types to each defect, storing results in the PSEC Server Database 4120. This set of attributes categories and associated values is called the PSEC scheme. It uses some of the categories and values of the ODC scheme, as well as adding new categories and new values.

In the current invention there are two types of defect attributes: opener data, that which is known when the defect is first discovered, and closer data, which is only available after a given defect has been resolved. In the current invention, the opener data associated with each that is stored in the PSEC Server Database 4120 comprises:

Unique ID, which can be used to distinguish one defect from all others.

VIN (Vehicle Identification Number), which, in the preferred embodiment is the unique encoded alphanumeric string that every automobile has assigned to, this string not only including a unique ID (serial number) for the car, but also indication the car's make, model, and manufacturing plant (for details, see http://en.wikipedia.org/wiki/VIN).

Ownership Duration indicates long the product was owned before the defect occurred. In one embodiment of the current invention these revealing conditions include, but are not limited to (note that they are listed in order of shortest to longest):

Short—Year or less,

Medium—1 to 5 years,

Long—5 years to disposal.

One skilled in the art will appreciate that the current invention also includes embodiments in which the Ownership Duration attribute has more or less than 3 values, and in which the values differ from those above (values applicable for the automotive industry). Such alternatives are needed for other mass manufacturing industries, such as the aeronautics industry, whose product: planes are owned and used for well over 5 years, on average. Thus the Long value would have to be greater than 5. Such values are also necessary because different industries have warranty periods of different length.

In the current embodiment, the closer data associated with each that is stored in the PSEC Server Database 4120. In addition to openers and closers, there are mapped attributes whose values for a given defect are computed from other attributes for the given defects. There are also derived attributes whose values for a given defect can only be computed when all of the defects and all other attributes have been computed [0550] # Units Affected, indicates the total number of product instances that have suffered from this same defect. It is derived by counting the number of defects that identical part # and corrective action value.

Every defect is classified with each of the attributes above with all of the data stored in the PSEC Server Database 4120. Note that the PSEC Scheme includes data concerning not only software, but hardware and electronics as well (e.g., in the Parts Hierarchy). Further, note that the PSEC Scheme also includes data and analysis techniques targeting mass manufacturing production processes (e.g., Test Type:Manufacturing Test and Phase of Defect Injection: Manufacturing).

As is described in detail with reference to FIG. 6, the Analysis Handler 4100 uses the classified defect data stored in the PSEC Server Database 4120 to provide data for and answers to questions related to the production and testing process of the mass manufacturer.

As is described in detail with reference to FIG. 6, the Suggested Actions Reports handler 4110 compiles the charts and text results stored in the PSEC Server Database 4120 to generate a report containing suggested modification to one or more production or testing processes in the mass manufacturing industry's production, testing, and delivery processes. Such suggestions can include, but are not limited to the addition of a new test phase, or an indication of whether or not a given product is ready for public sale. In addition to textually described suggestions, the report can also include graphical charts justifying the given suggestions, often more than two or more such graphical charts per suggestion.

A skilled artisan will appreciate that the current invention also includes a PSEC scheme that includes the service context in which a given defect was found as an attribute, with values including but not limited to: scheduled maintenance, non-scheduled maintenance, and product recall.

A skilled artisan will further appreciate that the current invention also includes a PSEC scheme that includes the attributes that indicate the complexity level—e.g., indicated numerically—of other attributes. Examples include, but not limited to Condition Revealing Defect Complexity: 1 for Single Function 2 for Single Function with Option 3 for Interaction and Sequencing 4 for Workload/Stress, Recovery/Exception, Startup/Restart, Environmental, and Stress.

Figure 5:
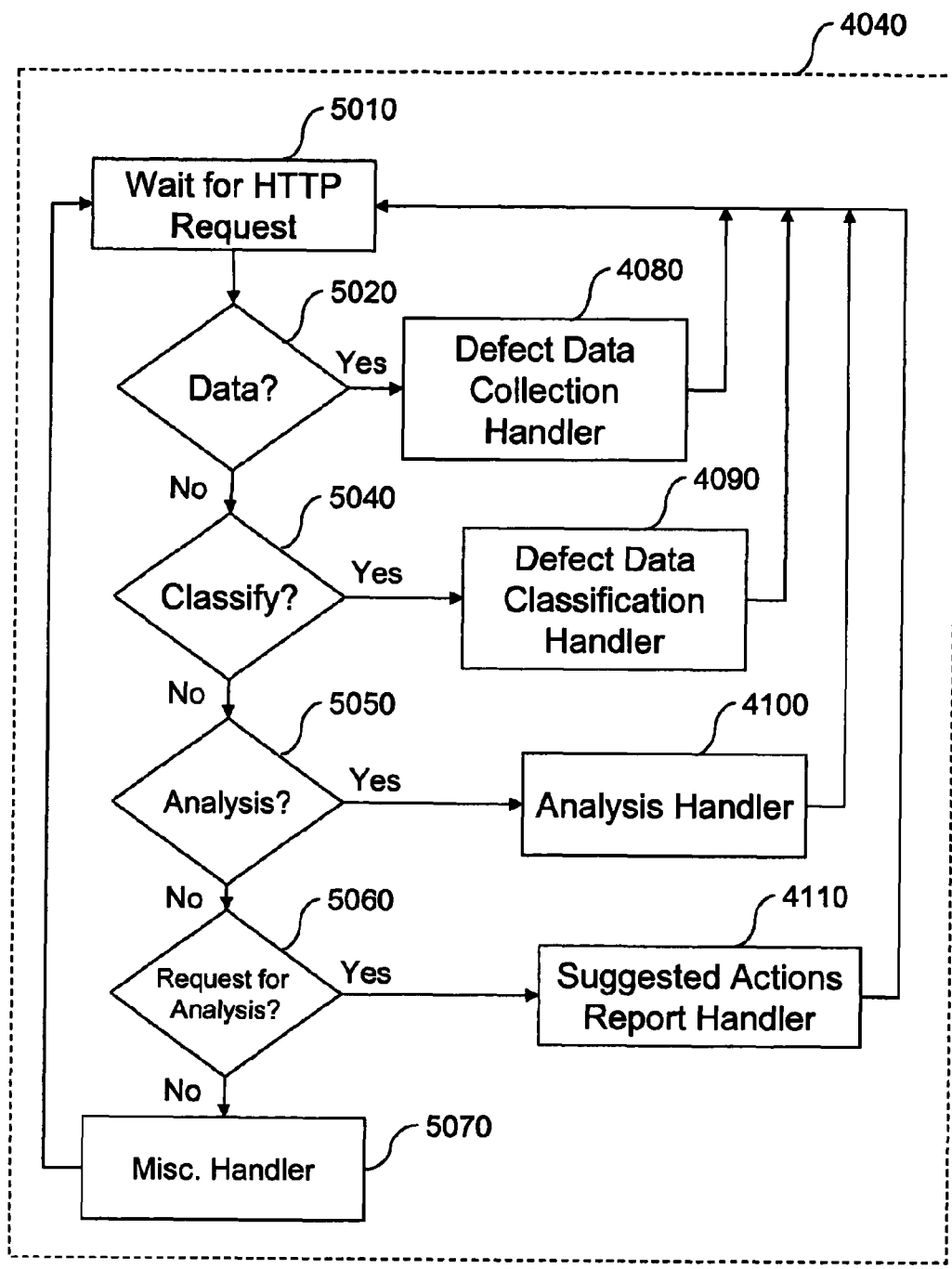
FIG. 5 is an illustrative flow diagram of the operation of a PSEC Server according to one embodiment of the invention.

FIG. 5 is a detailed flow diagram of the operation of the PSEC Server logic 4040. In step 5010, the HTTP Server Handler 4050 awaits an HTTP request. When such a request arrives, step 5020 checks whether it is a request for the Defect Data Collection Handler 4080. If so, this handler 4080 is invoked following which control continues at step 5010. If the request is not for the Defect Data Collection Handler 4080, then step 5040 checks whether it is a request for the Defect Data Classification Handler 4090. If so, this handler 4090 is invoked following which control continues at step 5010. If the request is not for the Defect Data Classification Handler 4090, then step 5050 checks whether it is a request for the Analysis Handler 4100. If so, this handler 4100 is invoked following which control continues at step 5010. If the request is not for the Analysis Handler 4100, then step 5040 checks whether it is a request for the Suggested Actions Report Handler 4110. If so, this handler 4110 is invoked following which control continues at step 5010. If the request is not for the Suggested Actions Report Handler 4110, then a miscellaneous handler, beyond the scope of the current invention, is called in step 5070, following which control continues at step 5010. The Suggested Actions Report Handler 4110 is configured for recommending modifications to the end user for at least one of the design, production, or testing processes based on the analysis.

Figure 6:
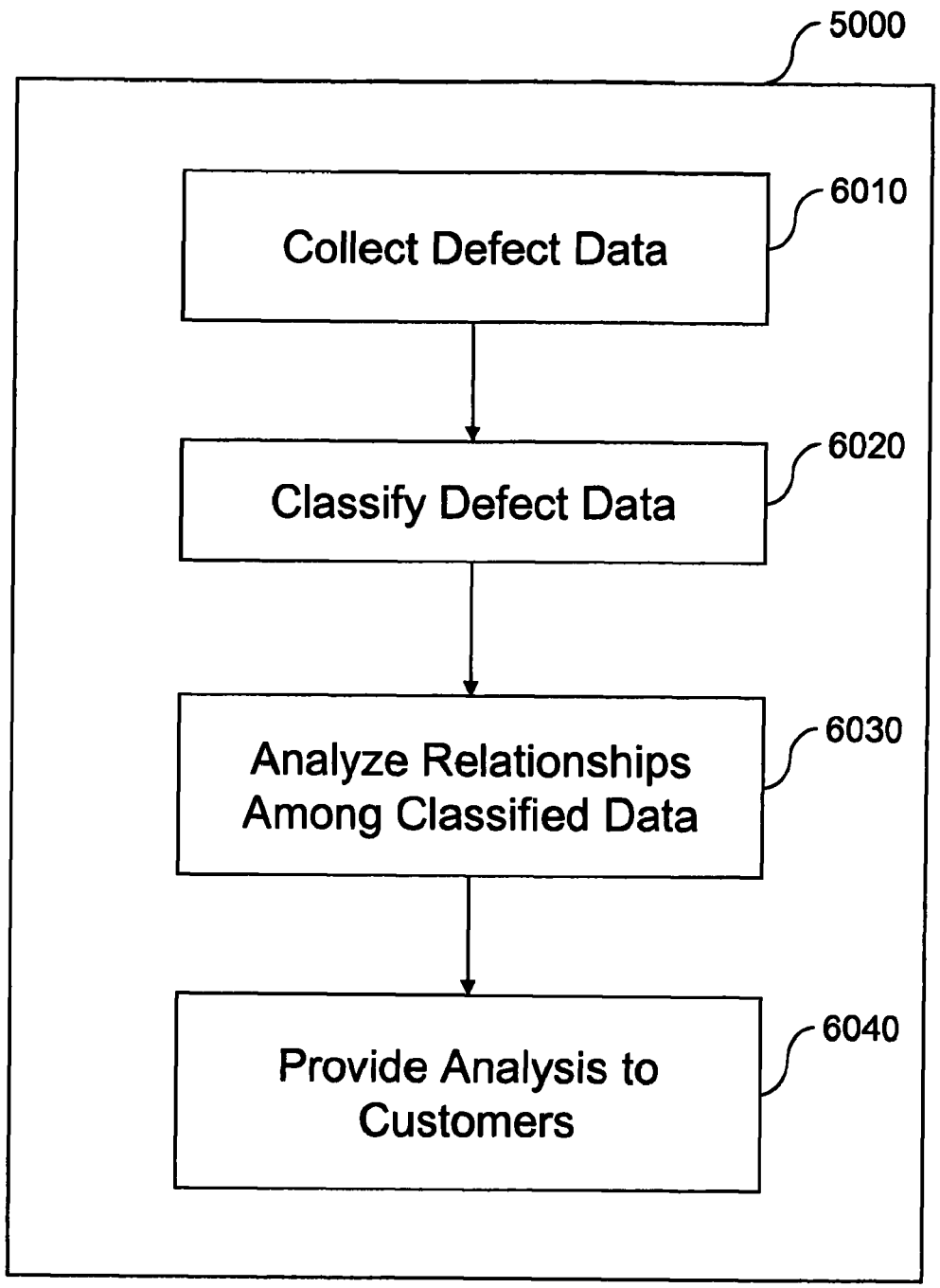
FIG. 6 is an illustrative flow diagram of the operation of the PSEC Method according to one embodiment of the invention.

Referring to FIG. 6, a flow diagram 5000 of the operation of the current embodiment is shown. In particular, a case involving an automobile manufacturer is given. First, in step 6010 all defect data for a particular make (e.g., Ford) and model (e.g., Corvette) of car is collected, this data being using the Defect Data Collection Handler 4080 from any of Clients A-D 3100-3130 via the PSEC Client Applet 4060. Skilled artisans will appreciate that any additions could be made manually (i.e. by a human typing information into a computer running the PSEC Client Applet 4060 via a web browser, or by an automatic data collection program, also which communicates with the PSEC server 3050 via the PSEC Client Applet 4060. Thus, the current embodiment allows a given mass manufacturing industry to automate its defect data collection. Skilled artisans will appreciate that this defect data includes in-process production data (e.g., data from the Mass Manufacturing Plant 3010), as well as post-sales, service data (e.g., from the Product Dealer 3020, or the Product Service Provider 3030).

Next, in step 6020, the defect data is classified using the Defect Data Classification Handler 4090, again via accesses from Clients A-D 3100-3130. Skilled artisans will appreciate that although the classifications may be made by employees of the manufacturing organization (e.g., Ford), including but not limited to domain experts, a service organization could also provide one or more of the classifications.

A skilled artisan will appreciate that if a given mass manufacturing organization obtained its parts 120 or subsystems 1010 from another given component supplier, and if that given component supplier used to current invention to analyze its defects, then the mass manufacturing organization could use the PSEC scheme-based classified defect data for its own defect analysis.

Next, in step 6030, using the Analysis Handler 4100, relationships amongst the classified data are sought to answer questions relevant to the mass manufacturer (e.g., which production process(es) is (are) producing the defects that drive the majority of the warranty costs?). This research can also provide indications of salient problems. For example, suppose that a chart displaying the number of defects that escape from (i.e., are not caught by) each of the test processes 2020, 2040, 2070, 2100, 2130 and 2160 shows that vast majority come from the Part testing phase 2040.

Then, if the goal of the given mass manufacturer is to save money, more attention and/or resources (e.g., time, and personnel) should be spent on Part testing 2040, so as to keep these defects from escaping to the later stages where they are more expensive to overcome.

The Analysis Handler 4100 also includes rules that test the classified data to answer specific questions. Skilled artisans will appreciate that one or more of these rules can be provided when the current invention is first provided to a given organization (e.g., mass manufacturer). An example of such a rule would be one that reviews the Product Impact of the defects and then specifies the given product's reliability: e.g., "high" returned if none of the defects made the product inoperable, "average" if only a few did, and "low" if most defects did.

Finally, in step 6040, the current invention compiles a charts and results into a report using the Suggested Actions Report Handler 4110. Skilled artisans will appreciate that Suggested Actions Report Handler 4110 could either of following methods: Automatic compilation of all charts and results generated by the Analysis Handler 4100 and stored in the PSEC Server Database 4120, or Allowing an end-user to select the charts and results they wish to include and then compiling only entities into the final report. A skilled artisan will appreciate that one or more members of a service organization could provide the chart and result selection described above instead of an employee of the mass manufacturer, A skilled artisan will also appreciate that the current invention could be executed multiple times by a given organization, e.g., periodically, say once a year, or to every new version of a given product. By doing this and comparing the results of each execution (e.g., comparing the reports produced in step 6040) the benefits realized by the given organization could include: Verifying that they are overcoming problem indicated in earlier reports, e.g., by checking the previous problems either vanish or are less severe in later reports; Verifying that their product are becoming more stable, reliable, or safe, e.g., by comparing the respective levels of stability, reliability, and safety between reports; or Verifying that are maintaining a sufficient level of production and testing quality, e.g., by verifying that no new or higher severity problems are reported in later reports.

A skilled artisan will further appreciate that PSEC analysis reports from different organizations could be compared so as to judge the strengths and weaknesses of the organizations.

A skilled artisan will also appreciate that by using the both Charge Type attribute (i.e., whether or not the defect's repair was covered by warranty) and the Repair Cost attributes, the analysis provided by the Analysis Handler 4100 and reported by the Suggested Actions Report Handler could include consideration of each defect's warranty cost. Thus, a given organization interested in reducing their warranty-related costs could use the current invention to indicate relevant problems and to suggest corrective modifications to their production and testing processes.

A skilled artisan will also appreciate that by comparing and analyzing the classified defects data, especially using the In-Process attribute, the current embodiment can be used to compare defects that escaped (i.e., were created and yet not caught) the product's development and production to those that occurred our in the field.

A skilled artisan will finally appreciate that the current embodiment could be provided as a service by a service organization to the mass manufacturer. This service could include the service organization collecting the defects, classifying the defects, analyzing the classified defects and generating the report summarizing the analysis. This service could be offered on a continuing basis, e.g., the service organization could analyze and provide an analysis report to the mass manufacturer each year. The service could also include modifications and updates to the PSEC scheme used to analyze the given mass manufacturer.

A skilled artisan will further appreciate that variations, modifications, and other implementations of what is described herein may occur to those of ordinary skill in the art without departing from the spirit and scope of the invention. Accordingly, the invention is defined by the following claims and not to be defined only by the preceding illustrative description.

The invention claimed is:

1. An information processing system used by a service organization to provide an analysis report to a mass manufacturer and for optimizing at least one of a design, production, distribution chain or testing process of a product in a mass manufacturing process, the system comprising:
   a central processing unit;
   a network interface operatively connected to the central processing unit;
   a storage device; and
   a memory comprising logic for execution by the central processing unit, wherein the logic comprises:
   a server handler comprising a client applet and a client interface servlet configured for enabling authorized communication with an end user;
   a defect data collection handler configured for collecting error data relating to the product after design of the product at a plurality of points along the product's design, production, and distribution chain, wherein the error data comprises both test data found during production testing of the product, as well as post production customer service events;
   a defect data classification handler configured for classifying the error data into categories of errors to produce classified error data;
   an analysis handler configured for analyzing relationships among the classified error data; and
   a suggested actions report handler configured for producing an analysis report and recommending modifications to the end user for at least one of the design, production, or testing process based on the analysis the recommending comprising:
   recommending modifications to the design of the product if the error data is collected after design but before manufacture of the product, and if a design error is found;
   recommending modifications to the delivery process if the error data is collected after delivery, and if a delivery error is found;
   recommending modifications to the production process if the error data is collected after producing part of the product and if a part error is found;
   recommending modifications to the process of making a subsystem of the part if the error data is collected after producing the subsystem of the product comprising the part; and
   recommending modifications to the mass manufacturing process if the error data is collected after mass manufacturing, but before delivery, and if a mass manufacturing error is found;
   wherein the system performs steps of collecting, classifying, analyzing, producing, and recommending for every subsequent version of the product, and
   providing an analysis report to the mass manufacturer, as well as modifications and updates to a product service event classification scheme used to analyze the given mass manufacturer.

2. The information processing system of claim 1 further comprising a server database configured for storing, modifying, and deleting data.

3. The information processing system of claim 1 wherein the system is an HTTP server.

4. The information processing system of claim 1 wherein the logic is executed from a remote source.

5. The information processing system of claim 1 wherein the categories are selected from a group consisting of: a scope of fix, action, duration of ownership, and phase of error injection.

* * * * *